United States Patent
Wang (10) Patent No.: US 11,131,802 B2
(45) Date of Patent: Sep. 28, 2021

(54) MOUNTING ASSEMBLY AND LIGHT SOURCE MODULE FOR OPTICAL COMPONENT OF LIGHTING FIXTURE, AND LIGHTING FIXTURE

(71) Applicants: OPPLE LIGHTING CO., LTD., Shanghai (CN); SUZHOU OPPLE LIGHTING CO., LTD., Suzhou (CN)

(72) Inventor: Xiaolei Wang, Shanghai (CN)

(73) Assignees: Opple Lighting Co., Ltd., Shanghai (CN); Suzhou Opple Lighting Co., Ltd., Suzhou (CN)

( * ) Notice: Subject to any disclaimer, the term of this patent is extended or adjusted under 35 U.S.C. 154(b) by 0 days.

(21) Appl. No.: 16/908,720

(22) Filed: Jun. 22, 2020

(65) Prior Publication Data

US 2020/0319397 A1    Oct. 8, 2020

Related U.S. Application Data

(63) Continuation of application No. PCT/CN2018/124415, filed on Dec. 27, 2018.

(30) Foreign Application Priority Data

Dec. 28, 2017    (CN) .................. 201711470536.X
Dec. 28, 2017    (CN) .................. 201721890829.9

(51) Int. Cl.
*F21V 8/00*       (2006.01)
*F21V 29/70*    (2015.01)
(Continued)

(52) U.S. Cl.
CPC .......... *G02B 6/0088* (2013.01); *F21V 17/104* (2013.01); *F21V 23/06* (2013.01);
(Continued)

(58) Field of Classification Search
CPC .. G02B 6/0088; G02B 6/0075; G02B 6/0085; F21V 29/70; F21V 17/104; F21V 23/06
See application file for complete search history.

(56) References Cited

U.S. PATENT DOCUMENTS

| | | | |
|---|---|---|---|
| 1,839,287 A * | 1/1932 | Wolfson | G02B 6/0043 40/546 |
| 2014/0362602 A1 | 12/2014 | Hofman | |
| 2015/0055343 A1* | 2/2015 | Liao | F21S 2/005 362/249.03 |

FOREIGN PATENT DOCUMENTS

| | | |
|---|---|---|
| CN | 204791854 U | 11/2015 |
| CN | 205016188 U | 2/2016 |

(Continued)

OTHER PUBLICATIONS

International Search Report of PCT Application No. PCT/CN2018/124415 dated Mar. 29, 2019, (4p).

*Primary Examiner* — Anabel Ton
(74) *Attorney, Agent, or Firm* — Arch & Lake LLP (57) ABSTRACT

The present disclosure discloses a mounting assembly for an optical element of a lighting lamp, including a base, a top frame and at least two side frames, one end of each of the at least two side frames is connected to the base and the other end is connected to the top frame; the at least two side frames, the base and the top frame enclose a mounting space for fixing the optical element, and the at least two side frames are configured to be distributed around the optical element and are configured to be connected to a side edge of the optical element. The present disclosure further discloses a light source module and a lighting lamp.

19 Claims, 9 Drawing Sheets

(51) Int. Cl.
   *F21V 17/10*       (2006.01)
   *F21V 23/06*       (2006.01)

(52) U.S. Cl.
   CPC ............ *F21V 29/70* (2015.01); *G02B 6/0075* (2013.01); *G02B 6/0085* (2013.01)

(56) References Cited

FOREIGN PATENT DOCUMENTS

| | | |
|---|---|---|
| CN | 107990220 A | 5/2018 |
| CN | 207648598 U | 7/2018 |

\* cited by examiner

MOUNTING ASSEMBLY AND LIGHT SOURCE MODULE FOR OPTICAL COMPONENT OF LIGHTING FIXTURE, AND LIGHTING FIXTURE

CROSS-REFERENCE TO RELATED APPLICATIONS

This application is based upon and claims the priority of PCT patent application No. PCT/CN2018/124415 filed on Dec. 27, 2018 which claims priority to the Chinese patent application No. 201711470536.X filed on Dec. 28, 2017 and the Chinese patent application No. 201721890829.9 filed on Dec. 28, 2017, the entire content of all of which is hereby incorporated by reference herein for all purposes.

TECHNICAL FIELD

The present disclosure relates to the technical field of lighting lamp design, and in particular to a mounting assembly for an optical element of a lighting lamp, a light source module and a lighting lamp.

BACKGROUND

With the progress of science and technology and the improvement of people's needs, the performance of lighting lamps has been greatly improved. There are more and more kinds of lighting lamps in the market. More and more lighting lamps are developing towards the dual role of both lighting and decoration, thus continuously optimizing people's living environment.

SUMMARY

The present disclosure discloses a mounting assembly, a light source module and a lighting lamp.

According to one aspect, the present disclosure provides a mounting assembly for an optical element of a lighting lamp. The mounting assembly may include a base, a top frame and at least two side frames. One end of each of the at least two side frames may be connected to the base and the other end of each of the at least two side frames may be connected to the top frame; the at least two side frames and the base and the top frame may enclose an mounting space for fixing the optical element; and the at least two side frames may be configured to be distributed around the optical element and being connected to a side edge of the optical element.

According to another aspect, the present disclosure provides a light source module. The light source module may include a light source panel provided with a light emitting element, an optical element, and a mounting assembly comprising a base, a top frame, and at least two side frames.

One end of each of the at least two side frames may be connected to the base and the other end of each of the at least two side frames may be connected to the top frame, the at least two side frames, the base and the top frame may enclose a mounting space for fixing the optical element, and the at least two side frames may be configured to be distributed around the optical element and to be connected to a side edge of the optical element.

The optical element may be assembled into the mounting space, light of the light emitting element may be configured to be incident into the optical element, and the optical element may include a top end, a bottom end, a side edge, a first surface, and a second surface. Both the first surface and the second surface may be perpendicular to the top end, the bottom end, and the side edge, the first surface and the second surface may be surfaces on opposite sides of the optical element, and the light of the light emitting element may be incident from the top end, the bottom end and/or the side edge and may be emitted from the first surface and/or the second surface.

According to a further aspect, the present disclosure provides a lighting lamp. The lighting lamp may include a lamp base and a light source module, where the light source module may be connected to the lamp base, the light source module may include a light source panel provided with a light emitting element, an optical element, and a mounting assembly having a base, a top frame, and at least two side frames.

One end of each of the at least two side frames may be connected to the base and the other end of each of the at least two side frames may be connected to the top frame, the at least two side frames, the base and the top frame may enclose a mounting space for fixing the optical element, and the at least two side frames may be configured to be distributed around the optical element and to be connected to a side edge of the optical element.

The optical element may be assembled into the mounting space, light of the light emitting element may be configured to be incident into the optical element, and the optical element may include a top end, a bottom end, a side edge, a first surface, and a second surface. Both the first surface and the second surface may be perpendicular to the top end, the bottom end, and the side edge, the first surface and the second surface may be surfaces on opposite sides of the optical element, and the light of the light emitting element may be incident from the top end, the bottom end and/or the side edge and may be emitted from the first surface and/or the second surface.

It is to be understood that both the foregoing general description and the following detailed description are exemplary and explanatory only and are not restrictive of the present disclosure.

BRIEF DESCRIPTION OF THE DRAWINGS

The drawings described herein are used to provide a further understanding of the present disclosure and form a part of the present disclosure. The illustrative examples of the present disclosure and the description thereof are used to explain the present disclosure and do not constitute improper limitation of the present disclosure. In the drawings.

DETAILED DESCRIPTION

In order to make objects, technical details and advantages of the present disclosure apparent, the technical solutions of the present disclosure are described in a clearly and fully understandable way in connection with the examples of the present disclosure and the corresponding drawings. The described examples are just a part but not all of the examples of the present disclosure. Based on the described examples herein, those skilled in the art can obtain other example(s), without any inventive work, which should be within the scope of the present disclosure.

The technical solutions provided by each of the examples of the present disclosure will be described in detail below with reference to the accompanying drawings.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference numbers are provided below for the present disclosure:

100—base, 110—first clamping groove, 120—fixing part, 121—quick electrical connector, 130—radiator, 131—clamping gap, 132—groove, 140—insulating and heat conductive pad, 141—second avoiding hole;

200—top frame, 210—second clamping groove;

300—side frame, 310—third clamping groove;

400—optical element, 410—side edge, 420—base plate, 430—sub plate, 440—base plate, 441—first connection groove, 450—sub plate, 451—second connection groove;

500—light source panel, 510—light emitting element;

600—electrical connection device, 610—pressure cap, 620—female end component, 621—conductive terminal, 622—compression spring, 623—female end circuit board, 624—female end base, 6241—female end cylinder part, 6242—female end support plate part, 6243—accommodating part, 630—male end component, 631—male end circuit board, 6311—male end conductive part, 632—male end base, 6321—male end cylinder part, 6322—male end support plate part, 6323—protrusion, 633—male end cover plate;

1a—mounting hanging plate, 2a—wiring terminal, 3a—electronics, 4a—riveting buckle, 5a—mask, 6a—ceiling box, 7a—wire adjuster, 8a—hanging wire, 9a—nut, 10a—anti-pull plastic buckle, 11a—hanging rod, 12a—light source module, 13a—female end component, 14a—fixing plate, 15a—lamp cup, 16a—lamp holder, 17a—wiring cover, 18a—rivet, 19a—light source assembly;

1b—ceiling assembly, 2b—nut, 3b—threaded sleeve, 4b—hook, 5b—hanging chain, 6b—first lamp holder, 7b—first center box, 8b—upper center rod, 9b—third center box, 10b—lower center rod, 11b—second center box, 12b—light source module, 13b—female end component, 14b—fixing plate, 15b—lamp cup, 16b—second lamp holder, 17b—decorative part buckle.

In a lighting lamp, an optical element, such as a light guide plate, is one of the important components of the lighting lamp, which is used to guide out the light emitted by the light emitting element of the lighting lamp, thus achieving better decorative effects. Sometimes, the optical element is mounted on the mounting assembly of the lighting lamp. In the process of fixing the optical element, more threaded connection parts are needed to realize the connection between the mounting assembly and the optical element. The appearance of the lighting lamp can be affected if more threaded connection parts are exposed. This may affect the decorative effect of the lighting lamp. More importantly, in the process of assembling and disassembling, the assembler needs to screw more threaded connection parts, which leads to complicated assembling and disassembling operations of the lighting lamp.

At the same time, the exposure of more threaded connection parts may affect the light distribution effect of the optical element, thus making it difficult to meet the light distribution requirements of users.

Referring to FIGS. 1-7, an example of the present disclosure discloses a mounting assembly for an optical element of a lighting lamp, the mounting assembly can realize the assembly of an optical element 400. The disclosed mounting assembly includes a base 100, a top frame 200 and at least two side frames 300.

One end of the at least two side frames 300 is connected to the base 100 and the other end of the at least two side frames 300 is connected to the top frame 200. The at least two side frames 300 enclose a mounting space for fixing the optical element 400 with the base 100 and the top frame 200, and the at least two side frames 300 are configured to be distributed around the optical element 400 and are configured to be connected to the side edge 410 of the optical element 400.

After the optical element 400 is placed in the mounting space, the top end of the optical element 400 is positioned by the top frame 200, the bottom end of the optical element 400 is positioned by the base 100, and the side edge 410 of the optical element 400 are positioned by the side frames 300. The at least two side frames 300, the base 100 and the top frame 200 fold the optical element 400 in the mounting space, thereby realizing the fixation of the optical element 400.

In the mounting assembly disclosed in the example of the present disclosure, the optical element 400 can be assembled and positioned in the space enclosed by the at least two side frames 300, the base 100 and the top frame 200. The entire fixing process can realize the assembly of the optical element 400 through the mounting space formed by the connection among the side frames 300, the base 100 and the top frame 200 without using a threaded connection part to fix the optical element 400. This may avoid the problem of complicated disassembly and assembly caused by screwing a plurality of threaded connection parts when the optical element 400 is connected to other components through threaded connection parts. At the same time, because the optical element 400 is not assembled by the threaded connection parts, the influence of the threaded connection parts on the light distribution of the optical element 400 can be avoided.

The at least two side frames 300, the base 100 and the top frame 200 are components of the mounting assembly, and various connection structures can be adopted between these components.

In an example, the bottom ends of the at least two side frames 300 are integrated with the base 100, and the top ends of the at least two side frames 300 are detachably connected to the top frame 200. In another example, the top ends of the at least two side frames 300 are integrated with the top frame 200, and the bottom ends of the at least two side frames 300 are detachably connected to the base 100. In the above two examples, it is possible to reduce the amount of assembling operations between each of the members.

The bottom ends of the at least two side frames 300 can be clamped and fixed to the base 100, or the top ends of the at least two side frames 300 can be clamped and fixed to the top frame 200. The top and bottom ends of the at least two side frames 300 can be respectively clamped and fixed to the top frame 200 and the base 100, i.e., detachably connection is realized by clamping. The clamping and fixing method does not need an intermediate connection part, and the fixing and assembling can be realized directly through clamping and buckling between matched parts.

The base 100 can be provided with a first clamping groove 110 for plug-in fitting with the bottom end of the optical element 400. In this case, the bottom end of the optical element 400 is directly clamped in the first clamping groove 110, thereby realizing the clamping connection with the base 100. The base 100 can be provided with a first protrusion for plug-in fitting with the bottom end of the optical element 400. In this case, the bottom end of the optical element 400 can be provided with a bottom end clamping groove, and the first protrusion can be inserted into the bottom end clamping groove, thereby realizing the clamping fit between the base 100 and the optical element 400.

Similarly, the top frame 200 can be provided with a second clamping groove 210 for plug-in fitting with the top end of the optical element 400. In this case, the top end of the optical element 400 is directly clamped in the second clamping groove 210, thereby realizing the clamping connection with the top frame 200. The top frame 200 can also be provided with a second protrusion for plug-in fitting with the top end of the optical element 400. In this case, the top end of the optical element 400 can be provided with atop end clamping groove, and the second protrusion can be inserted into the top end clamping groove, thereby realizing the plug-in fitting of the top frame 200 with the optical element 400.

Similarly, the side frame 300 can be provided with a third clamping groove 310 for plug-in fitting with the side edge 410 of the optical element 400. In this case, the side edge 410 of the optical element 400 is directly clamped in the third clamping groove 310, thereby realizing the clamping connection with the side frame 300. The side frame 300 can also be provided with a third protrusion for plug-in fitting with the side edge 410 of the optical element 400. In this case, the side edge 410 of the optical element 400 can be provided with a side clamping groove, and the third protrusion can be inserted into the side clamping groove, thereby realizing the plug-in fitting of the side frame 300 with the optical element 400.

Figure 4:
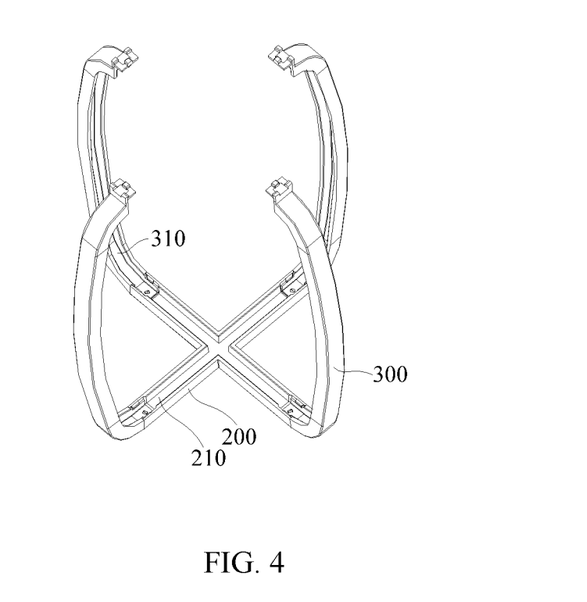
FIG. 4 is a schematic diagram of an assembly structure of the side frames and the top frame disclosed in the example of the present disclosure.
Figure 5:
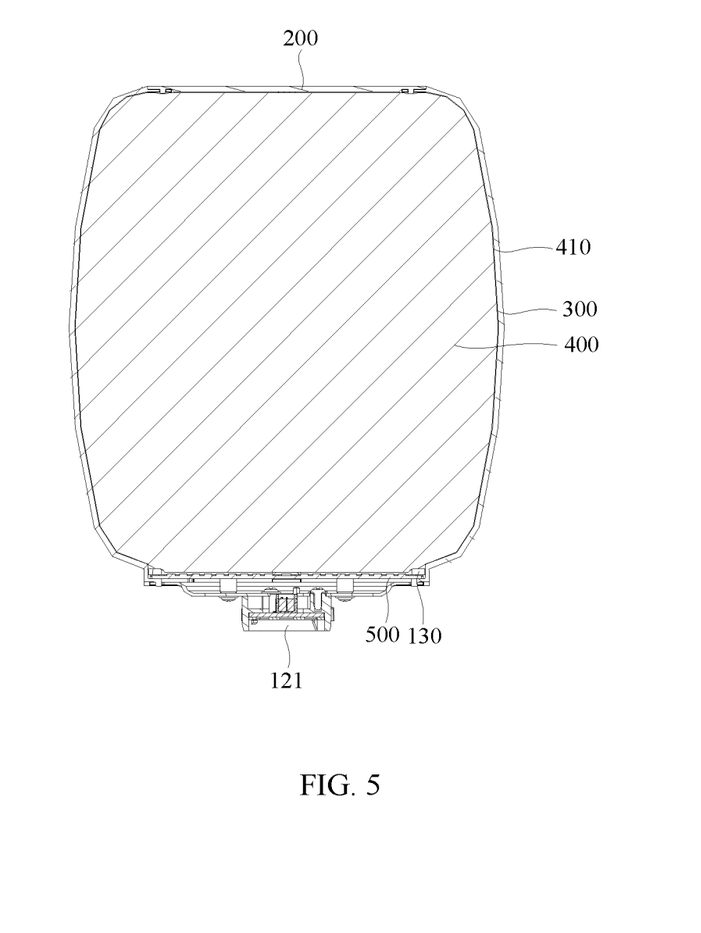
FIG. 5 is a schematic cross-sectional structural diagram of a light source module disclosed in an example of the present disclosure.
Figure 6:
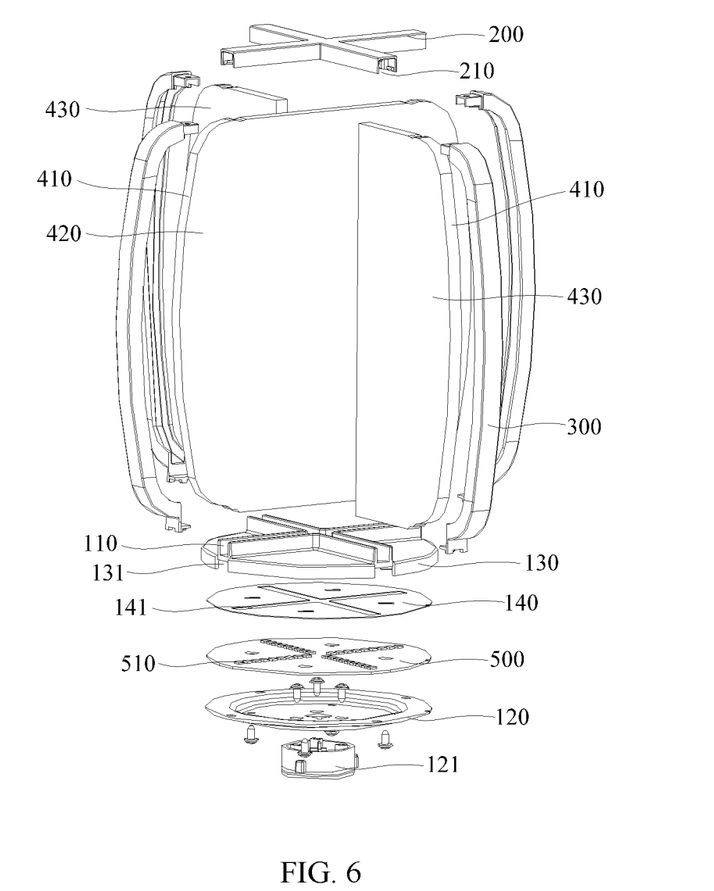
FIG. 6 is an exploded structural diagram of a light source module including an optical element disclosed in an example of the present disclosure.

In a preferred scheme, the base 100 is provided with a first clamping groove 110 for plug-in fitting with the bottom end of the optical element 400; the top frame 200 is provided with a second clamping groove 210 for plug-in fitting with the top end of the optical element 400; the side frame 300 has a third clamping groove 310 for plug-in fitting with the side edge 410. The first clamping groove 110, the second clamping groove 210 and the third clamping groove 310 are connected with each other. In this case, the corresponding parts on the optical element 400 can be wrapped to achieve more comprehensive wrapping positioning, as illustrated in FIGS. 4 and 6.

Referring again to FIG. 6, for example, the optical element 400 can be a light guide plate having a cross-section of a cross shape, i.e., the shape of the cross-section of the optical element 400 (the cross-section parallel to the top or bottom end) is cross, in this case, the optical element 400 has four side edges 410. In this case, the first clamping groove 110 and the second clamping groove 210 are both cross-shaped clamping grooves, the number of the side frames 300 is four, one end of each of the four side frames 300 is clamped on one corresponding notch of the four notches of the first clamping groove 110, and the other end of each of the four side frames 300 is clamped on one corresponding notch of the four notches of the second clamping groove 210, so that two ends of each third clamping groove 310 are connected/communicated with the first clamping groove 110 and the second clamping groove 210.

In the design process, the shapes of the first clamping groove 110 and the second clamping groove 210 can be adaptively adjusted according to the end shape of the optical element 400, thereby achieving the purpose of better adaptive clamping. The top frame 200 and the base 100 can adopt a shape corresponding to the end shape of the optical element 400. For example, when the optical element 400 is a light guide plate having a cross-section of a cross shape, the top frame 200 can be a cross-shaped frame body.

In order to facilitate assembly, in a preferred scheme, the top frame 200 and/or the at least two side frames 300 can be plastic parts, in this case, the top frame 200 and the at least two side frames 300 have good deformation during assembly, facilitating assembly operation.

Referring again to FIGS. 1-7, based on the mounting assembly disclosed in the example of the present disclosure, the example of the present disclosure also discloses a light source module. The disclosed light source module includes a light source plate 500, an optical element 400 and the mounting assembly described in the example above. The optical element 400 is assembled into the mounting space formed by the mounting assembly. The light source plate 500 is provided with a light emitting element 510, and the light of the light emitting element 510 is configured to be incident into the optical element 400, thereby realizing light distribution through the optical element 400.

The optical element 400 includes a top end, a bottom end, the side edge 410, and a first surface and a second surface, both the first surface and the second surface are perpendicular to the top end, the bottom end, and the side edge 410 of the optical element 400. The first surface and the second surface are surfaces on opposite sides of the optical element 400. Light of the light emitting element 510 is incident from the top end, the bottom end, and/or the side edge 410 of the optical element 400, and is emitted from the first surface and/or the second surface, thereby completing light distribution.

In an example, the light source plate 500 is arranged on the base 100, and the light emitting element 510 is arranged to be opposed to the optical element 400.

In another example, the light source panel 500 can be arranged on the side frame 300, and the light emitting element 510 can be arranged to be opposed to the side edge 410 of the optical element 400. When the side frame 300 is provided with the third clamping groove 310, the light source plate 500 can adopt a flexible printed circuit board, thereby facilitating the arrangement of the light source plate 500 in the third clamping groove 310.

The optical element 400 is generally a light-transmitting light guide member. The optical element 400 can be a light guide member made of PC (Polycarbonate) or a light guide member made of acrylic light-transmitting material. The optical element 400 can be made of other light-transmitting materials, and the example of the present disclosure does not limit the material of the optical element 400. The optical element 400 can be a light guide plate or a light guide structure of other shapes.

Figure 7:
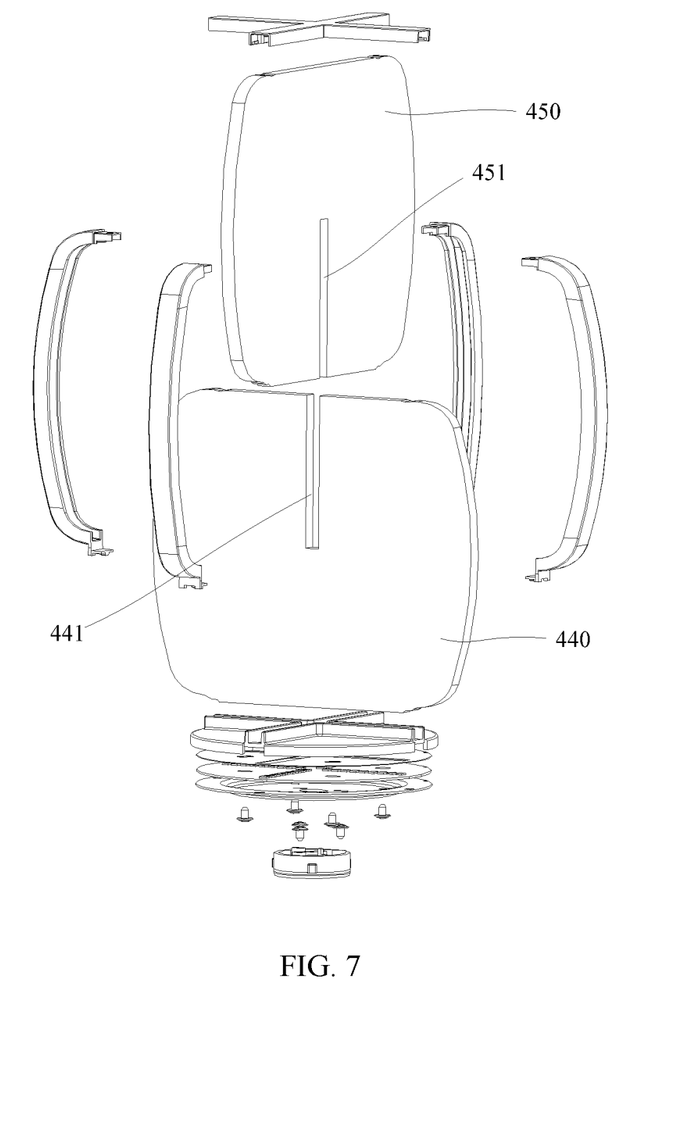
FIG. 7 is an exploded structural diagram of a light source module including another optical element disclosed in an example of the present disclosure.

Referring to FIGS. 6 and 7, the optical element 400 is a light guide plate, and the light guide plate can adopt a plurality of structures. The light guide plate can include a base plate 420 and a plurality of sub plates connected to the base plate 420. The plurality of sub plates intersect the base plate 420, and the edges of the base plate 420 and the sub plates are all the side edge 410 of the optical element 400.

Referring again to FIG. 6, the base plate 420 can be one and the sub plates 430 can be two. The two sub plates 430 are respectively connected to the two side surfaces of the base plate 420 and form a light guide plate having a cross-section of a cross shape with the base plate 420.

Referring to FIG. 7, the base plate 440 can be one, the sub plate 450 can also be one, and the base plate 440 can be provided with a first connection groove 441. The sub plate 450 can be provided with a second connection groove 451, the base plate 440 and the second connection groove 451 are in plug-in fit, and the sub plate 450 and the first connection groove 441 are in plug-in fit. During the mounting process, the base plate 440 and the sub plate 450 can be assembled by inserting each other.

FIGS. 6 and 7 are respectively two connection methods of the base plate and the sub plate, in the actual design process, the number of the base plate and the sub plate can be larger, thus enabling a larger number of the sub plates and a larger number of the base plates to form more optical elements 400 with more shapes. When a larger number of base plates and sub plates are assembled, the above assembly method is also applicable.

Referring again to FIGS. 2 and 6, the light source module disclosed in the example of the present disclosure can further include a fixing part 120 and a radiator 130, the fixing part 120 is interfaced with the radiator 130 to form an accommodating cavity, the light source plate 500 is arranged in the accommodating cavity, and the radiator 130 is provided with a first avoiding hole for avoiding light from the light emitting element 510, so that light can pass through and enter the optical element 400. The first avoiding hole reaches the purpose of avoiding light by avoiding the light emitting element 510. During the assembly process, the light emitting element 510 on the light source plate 500 can extend into the first avoiding hole to further realize the light guiding connection with the optical element 400. In this way, the distance between different optical elements 400 is smaller, thereby enabling the structure of the light source module to be more compact. The radiator 130 can better dissipate heat generated by the light emitting element 510 during operation in time.

Figure 1:
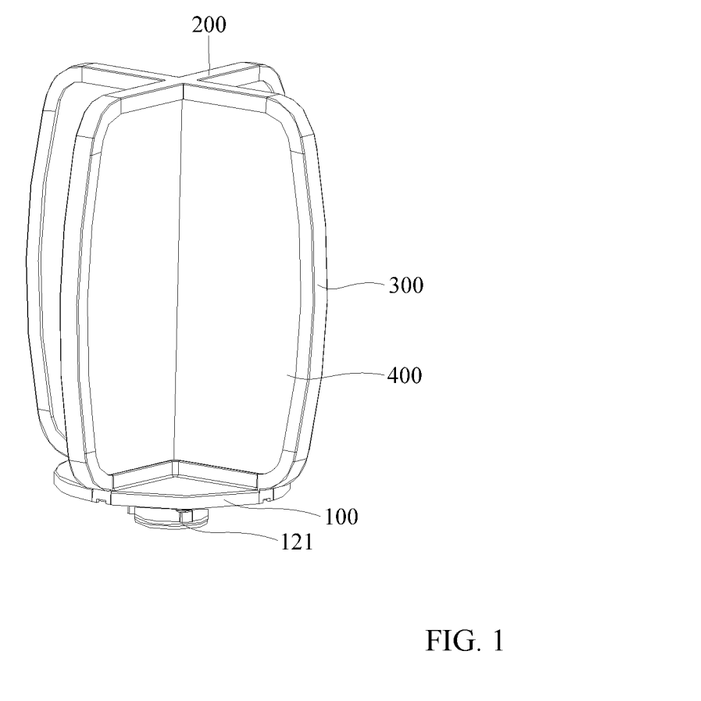
FIGS. 1 and 2 are schematic structural diagrams of a light source module disclosed in the example of the present disclosure under two viewing angles respectively.
Figure 2:
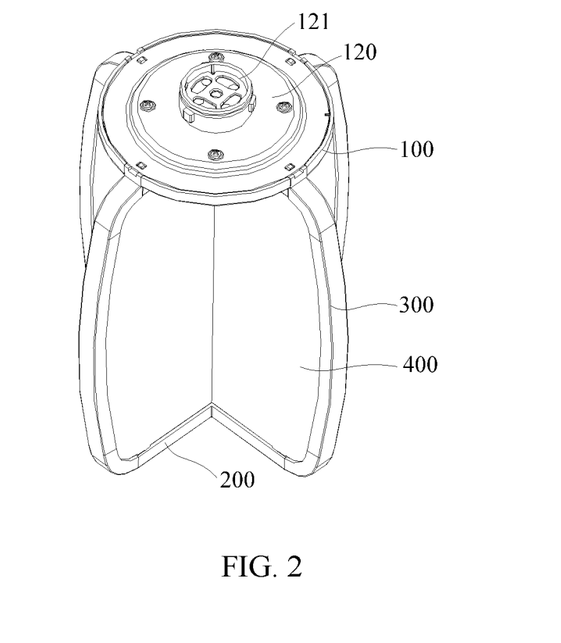

In order to better realize heat dissipation, in a preferred scheme, an electrically insulating and heat conductive pad 140 can be provided between the light source plate 500 and the radiator 130. The electrically insulating and heat conductive pad 140 is not electrically conductive but can conduct heat. A second avoiding hole 141 can be provided at a position of the electrically insulating and heat conductive pad 140 opposite to the first avoiding hole, and the electrically insulating and heat conductive pad 140 can conduct more heat to the radiator 130, thereby realizing faster heat dissipation. The electrically insulating and heat conductive pad 140 also has a function of assisting heat dissipation. The second avoiding hole 141 can allow the light emitting element 510 to pass through, so as to avoid the influence of the electrically insulating and heat conductive pad 140 on the arrangement of the light emitting element 510.

Figure 3:
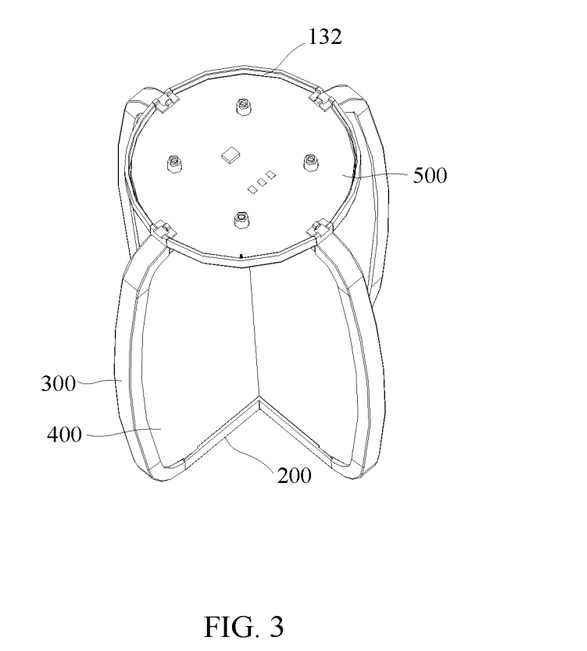
FIG. 3 is a partial schematic structural diagram of a light source module disclosed in the example of the present disclosure.

Referring to FIGS. 3 and 6, in the light source module disclosed in the example of the present disclosure, the end of the radiator 130 away from the optical element 400 has a groove 132, the side wall of the groove 132 can be provided with a clamping notch 131, the bottom end of the side frame 300 can be clamped and fixed with the clamping notch 131, and the light source panel 500 is fixed between the end of the side frame 300 and the bottom of the groove 132. The above fixing method can make the bottom end of the side frame 300 clamp to the back surface of the light source plate 500 (i.e., the surface away from the optical element 400), and then can make the light emitting element 510 on the light source plate 500 closer to the optical element 400, and finally can achieve better light distribution effect.

In order to achieve a better decorative effect, the surface of the optical element 400 can be provided with patterns. The patterns can be formed by silk screen printing, laser engraving, knife engraving, etching and other processes, and the patterns can also be formed by attaching a pattern film to the optical element 400.

The light source module disclosed in the example of the present disclosure can further include a quick electrical connector 121, which can be arranged on the side of the fixing part 120 away from the light source panel 500. The quick electrical connector 121 can realize the electrical connection between the light source module and the external power supply and the mechanical installation of the light source module, as illustrated in FIGS. 2, 5, 6 and 7.

There are many types of quick electrical connectors. In an example, the quick electrical connector can be a female end component 620 of the electrical connection device 600 described below or a male end component 630 of the electrical connection device 600. Please refer to the following description of relevant components for details.

Figure 8:
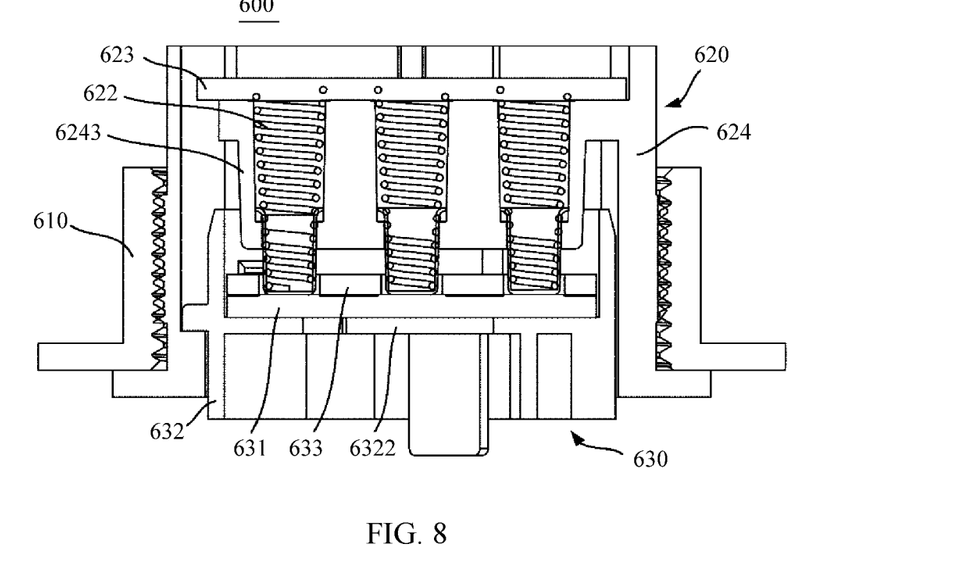
FIG. 8 is a schematic structural diagram of an electrical connection device disclosed in an example of the present disclosure.
Figure 9:
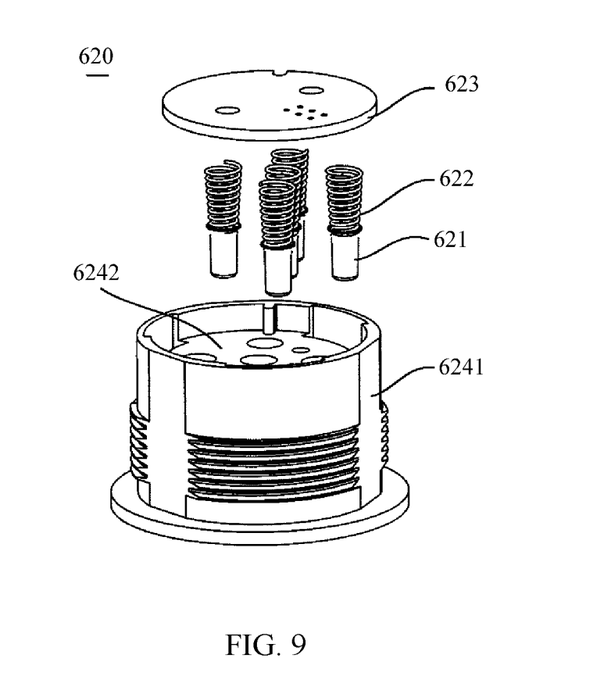
FIG. 9 is an exploded schematic diagram of a female end component disclosed in the example of the present disclosure.
Figure 10:
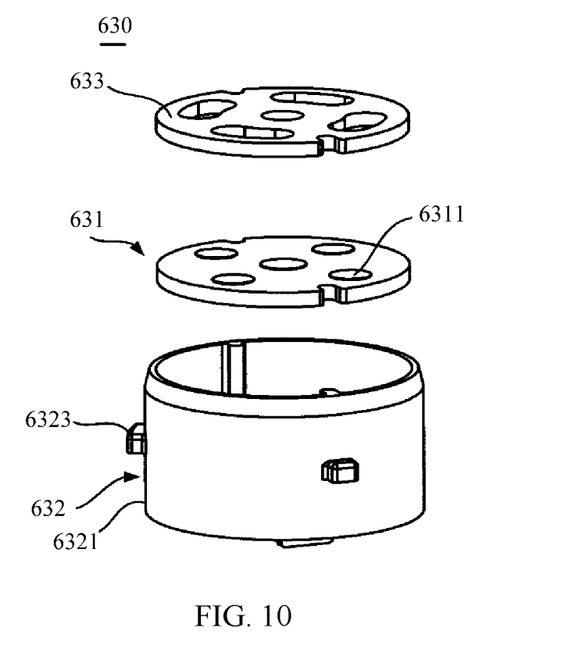
FIG. 10 is an exploded schematic diagram of a male end component disclosed in an example of the present disclosure.

Referring to FIGS. 8-10, an example of the present disclosure discloses an electrical connection device 600. The disclosed electrical connection device 600 is used to realize electrical connection between commercial power and a light source module of a lighting device, thereby providing power for lighting.

The electrical connection device 600 can include a female end component 620 and a male end component 630. Generally, the female end component 620 can be installed on a fixed base surface of a light source module such as a ceiling, a lamp holder, and the like, and is used for connecting with commercial power. The male end component 630 can be mounted on the light source module, and the male end component 630 and the female end component 620 can be detachably connected to facilitate replacement, overhaul or assembly of the two. The male end component 630 can be mounted on a fixed base surface and used to connect with the commercial power, and correspondingly, the female end component 620 is mounted on the light source module of the lighting lamp.

In the example of the present disclosure, the female end component 620 can have a plurality of conductive terminals 621 arranged in parallel and a plurality of compression springs 622 respectively acting on each conductive terminal 621. Generally, one compression spring 622 acts on one conductive terminal 621.

The male end component 630 generally has a male end circuit board 631, the surface of the male end circuit board 631 facing the plurality of conductive terminals 621 is provided with male end conductive parts 6311, and each male end conductive part 6311 is electrically connected to one end surface of one conductive terminal 621 facing the male terminal circuit board 631. The surface of the male circuit board 631 away from the plurality of conductive terminals 621 can be mounted with or electrically connected to the light source plate 500.

After the assembly of the male end component 630 and the female end component 620 is completed, each compression spring 622 can allow the corresponding conductive terminal 621 to be subjected to a force directed to one of the male end conductive parts 6311, so that the conductive terminal 621 contacts and abuts the corresponding male end conductive part 6311, thereby realizing reliable electrical connection between the female end component 620 and the male end component 630.

In a preferred scheme, each conductive terminal 621 can be a conductive cap, which can be sleeved at one end of a corresponding compression spring 622. For example, each compression spring 622 is a tapered spring, and each conductive terminal 621 is mounted on the tapered tip of one tapered spring. The conductive cap is sleeved on one end of the compression spring, so that the connection between the conductive cap and the corresponding compression spring 622 can be firmer, thereby further improving the reliability of the electrical connection between the female end component 620 and the male end component 630. Each conductive terminal 621 can also be a conductive post, one end face of each conductive post contacts and abuts against one end of the compression spring 622, and the other end face of each conductive post contacts and abuts against the corresponding male end conductive part 6311.

In an example, the female end component 620 can further include a female end circuit board 623, and the side of the female end circuit board 623 facing the male end circuit board 631 has a plurality of female end conductive parts. The other end of each compression spring 622 is in abutting contact with or fixed to the corresponding female end conductive part, so that each female end conductive part is electrically connected to a male end conductive part 6311 via a compression spring 622 and a conductive cap.

Both the female end circuit board 623 and the male end circuit board 631 further include a circuit board body. The plurality of male end conductive parts 6311 are mounted on the circuit board body of the male end circuit board 631 at a plurality of positions facing the surfaces of the plurality of conductive terminals 621. A plurality of female end conductive parts can be mounted at a plurality of positions on the circuit board body of the female end circuit board 623 facing the surface of the male end circuit board 631. Each of the female end conductive parts and each of the male end conductive parts 6311 can be formed by coating conductive materials on the circuit board bodies of the female end circuit board 623 and the male end circuit board 631. The conductive material can be copper, and the compression spring 622 and the conductive cap can be made of copper.

In the above-mentioned electrical connection device 600, the female end component 620 has a plurality of conductive terminals 621 arranged in parallel and a plurality of compression springs 622 respectively acting on each conductive terminal 621; the male end component 630 has a plurality of male end conductive parts, which can make the electrical connection device suitable for multi-channel current occasions. In the example illustrated in FIG. 1, the number of the conductive terminals 621 and the compression springs 622 can each be five, wherein one conductive terminal 621 is arranged at the central position of the female end component 620, and the remaining four conductive terminals 621 are uniformly distributed along the circumferential direction of the female end component 620 at the periphery of the central conductive terminal 621. That is, the female end circuit board 623 and the male end circuit board 631 can be electrically connected through five compression springs 622 and five conductive terminals 621. The light source module of the lighting lamp with the electrical connection device 600 can emit various types of light. Therefore, the electrical connection device 600 is particularly suitable for lighting lamps requiring various color temperatures such as RGBW or multiple currents.

FIG. 9 is an exploded schematic diagram of the female end component 620. As illustrated in FIG. 9, the female end component 620 further includes a female end base 624. The female end base 624 can have a female end cylindrical part 6241 with two ends open, a female end support plate part 6242 extending radially from the inner circumferential surface of the female end cylindrical part 6241 near the center of the female end cylindrical part 6241, and a plurality of accommodating parts 6243 extending in the axial direction of the female end cylindrical part 6241 from the side surface of the female end support plate part 6242 facing the male end circuit board 631. Each accommodating part 6243 can have a stepped through hole extending in the axial direction of the female end cylinder part 6241 at a central position; the female end support plate part 6242 has a plurality of communication holes respectively communicating with each stepped through hole. The female end circuit board 623 is mounted on the side of the female end support plate part 6242 away from the male end circuit board 631. At least part of each compression spring 622 is mounted in a stepped through hole and a communication hole. A part of each conductive terminal 621 is mounted in a stepped through hole, and one end of each conductive terminal 621 facing the male end circuit board 631 protrudes out of the stepped through hole.

FIG. 9 is an exploded schematic diagram of the male end component 630. As illustrated in FIG. 9, the male end component 630 further includes a male end base 632 and a male end cover plate 633. The male end base 632 has a male end cylindrical part 6321 with two ends open, and a male end support plate part 6322 extending radially from the inner peripheral surface of the male end cylindrical part 6321 near the center of the male end cylindrical part 6321; the male end cylinder part 6321 is detachably mounted in the female end cylinder part 6241. The male end cover plate 633 is mounted in the male end cylinder part 6321 and located between the male end support plate 322 and the female end support plate 6242, and has a plurality of holes for passing through one conductive terminal 621 respectively. The male end cover plate 633 and the male end support plate part 6322 are configured to sandwich the circuit board body of the male end circuit board 631 therebetween.

In order to facilitate the connection of the male end component 630 and the female end component 620, the male end base 632 can further include a plurality of protrusions 6323 extending radially outward from the outer peripheral surface of the male end cylinder part 6321. A plurality of guide grooves are also formed on the inner peripheral surface of the female end cylinder part 6241, each guide groove allowing a protrusion 6323 to move from one end of the female end cylinder part 6241 to the other end of the female end cylinder part 6241 in the radial direction of the female end cylinder part 6241, and then rotate at an angle in the circumferential direction of the female end cylinder part 6241 to detachably mount the male end component 630 to the female end component 620. In this example of the present disclosure, the special structure of the female end component 620 and the male end component 630 can make the structure of the electrical connection device and the lighting lamp compact and small in volume, and the assembly and disassembly between the male end component 630 and the female end component 620 are very convenient.

In a preferred scheme, a threaded groove is also formed on the inner circumferential surface of the female end cylinder part 6241. The electrical connection device can further include a pressure cap 610 with internal threads, which is mounted on the female end cylinder part 6241 and can clamp the female end component 620 and the male end component 630. The pressure cap 610 can be used for fixed connection with a ceiling box or ceiling to mount the female end component 620.

The light source module disclosed in the example of the present disclosure can include the above-mentioned electrical connection device 600. After a user purchases, one of the female end component 620 and the male end component 630 can be mounted in the light source module and the other can be fixed on a fixed base surface.

Based on the light source module disclosed in the example of the present disclosure, an example of the present disclosure also discloses a lighting lamp, the lighting lamp includes a lamp base and the light source module described in the example above, the light source module is mounted on the lamp base, thereby realizing installation.

The lighting lamp can be a street lamp, a desk lamp, a floor lamp, a wall lamp, a ceiling lamp or a pendant lamp, and the present disclosure does not limit the types of the lighting lamps.

The lamp base can include a foundation base mounted or placed on a foundation surface and a lamp holder arranged on the foundation base. On the premise that the lighting lamp is a pendant lamp, please refer to FIG. 11, which illustrates a pendant lamp with a structure, the pendant lamp includes a lamp base and a light source module 12a.

Figure 11:
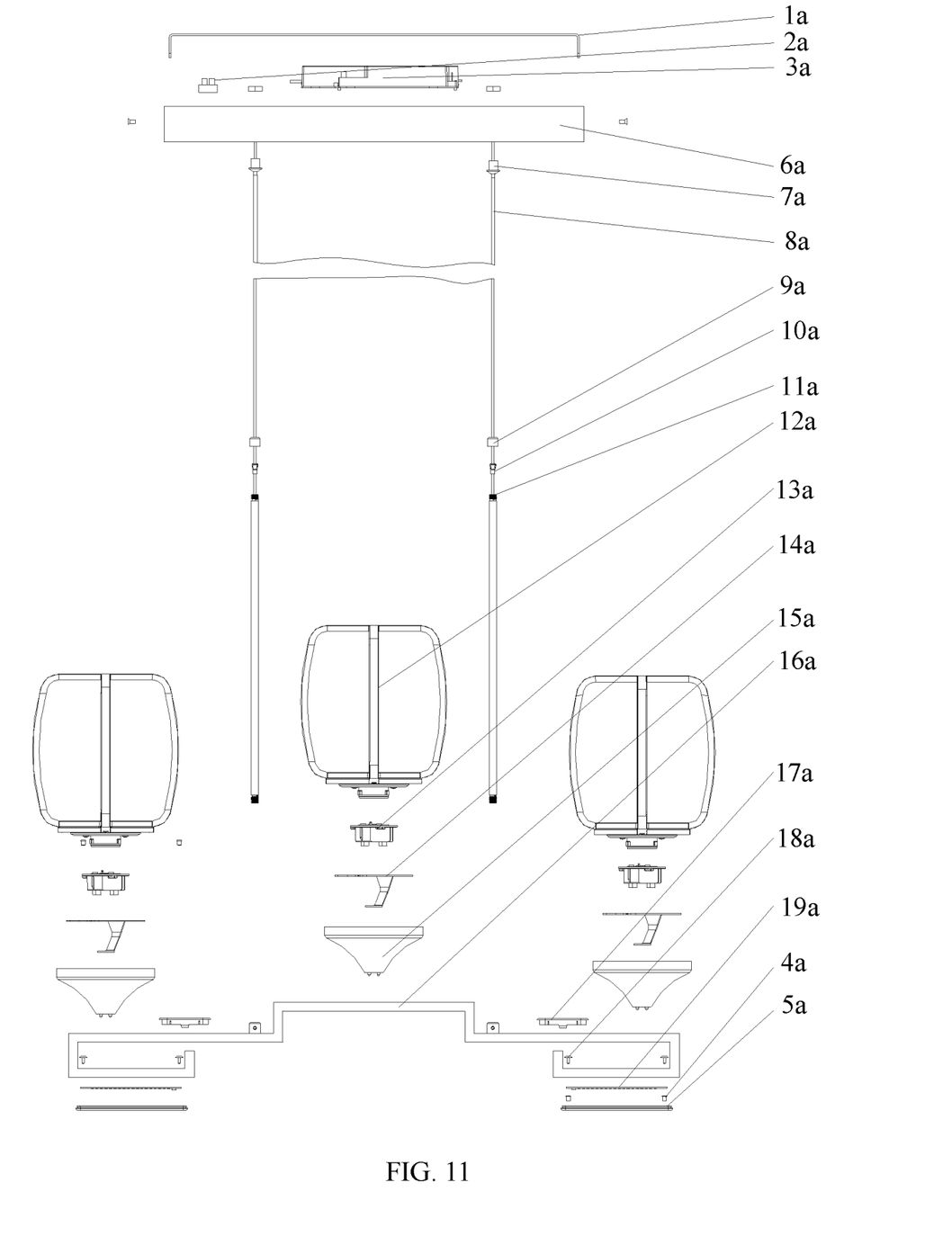
FIG. 11 is a schematic structural diagram of a pendant lamp disclosed in the example of the present disclosure.

The lamp base includes a ceiling assembly, a hoisting assembly and a lamp holder 16a, the lamp holder 16a is connected with the ceiling assembly through the hoisting assembly, and the ceiling assembly is usually mounted on a fixing foundation surface, such as an indoor roof. The hoisting assembly is connected with the lamp holder 16a for making the lamp holder 16a in a hoisting state, and the light source module 12a is mounted on the lamp holder 16a.

The ceiling assembly can include a mounting hanging plate 1a and a ceiling box 6a. The mounting hanging plate 1a is mounted on the fixing foundation surface, and the ceiling box 6a is butted with the mounting hanging plate 1a to form a cavity, which can provide a lamp base for other components. A wiring terminal 2a can be arranged in the cavity for realizing the integral power supply connection of the lighting lamp. Electronics 3a such as control boards, circuit boards, etc. can be mounted in the cavity. The wiring terminal 2a can be electrically connected to the electronics 3a, thereby realizing energization of the electronics 3a.

In the example of the present disclosure, the hoisting assembly can include a wire adjuster 7a and a hanging wire 8a. The wire adjuster 7a is threaded on the hanging wire 8a and can adjust the length of the hanging wire 8a.

In order to improve the stability of the whole lamp holder 16a in the hanging state, in a preferred scheme, the top end of the hanging wire 8a is connected to the ceiling assembly, and the bottom end can be connected to the lamp holder 16a through the hanging rod 11a. The hanging rod 11a is fixedly connected to the lamp holder 16a, thereby improving the swing prevention capability of the pendant lamp. The hanging rod 11a can be fixed to the lamp holder 16a by threads. The hanging wire 8a includes a power connection wire, the hanging rod 11a can be a hollow rod, and the power connection wire can pass through the hanging rod 11a and be electrically connected to the light source module 12a on the lamp holder 16a.

The hanging wire 8a can be screwed to the end of the hanging rod 11a by a fastening nut 9a. The end of the hanging wire 8a connected to the hanging rod 11a can be provided with an anti-pull plastic buckle 10a. Usually, the fastening nut 9a is threaded on the hanging wire 8a, and the anti-pull plastic buckle 10a can prevent the hanging wire 8a from falling off from the fastening nut 9a.

The light source module 12a can include the electrical connection device 600 described above, and the light source module 12a realizes mechanical connection and electrical connection with the lamp holder 16a through the electrical connection device 600. In an example, the male end component is connected to the light source plate 500, and the female end component 13a is arranged on the lamp holder 16a. The lamp holder 16a can be provided with a fixing plate 14a, and the female end component 13a can be mounted on the fixing plate 14a. In a preferred scheme, the lamp holder 16a can be provided with a lamp cup 15a, and the bottom end of the light source module 12a can be mounted in the lamp cup 15a. The lamp holder 16a can also be provided with a wiring cover 17a, which is used for auxiliary wiring, thus facilitating electrical connection.

In order to improve the decorative performance of the pendant lamp, the lamp holder 16a can be a symmetrical frame body, and the light source module 12a can be symmetrically mounted on the lamp holder 16a. The bottom surface of the lamp holder 16a can be provided with an auxiliary light source including a light source assembly 19a and a mask 5a. The light source assembly 19a and the mask 5a can be fixed to the lamp holder 16a through the mutual cooperation of the rivet 18a and the riveting buckle 4a. The auxiliary light source can emit light towards the ground, thus further improving the decorative performance and lighting capability of the pendant lamp.

In the lighting lamp illustrated in FIG. 11, the number of the light source modules 12a is three, one light source module 12a is located at the center position of the lamp holder 16a, and the other two are symmetrically arranged on two sides of the center position of the lamp holder 16a. There can be more light source modules 12a and more arrangements.

Figure 12:
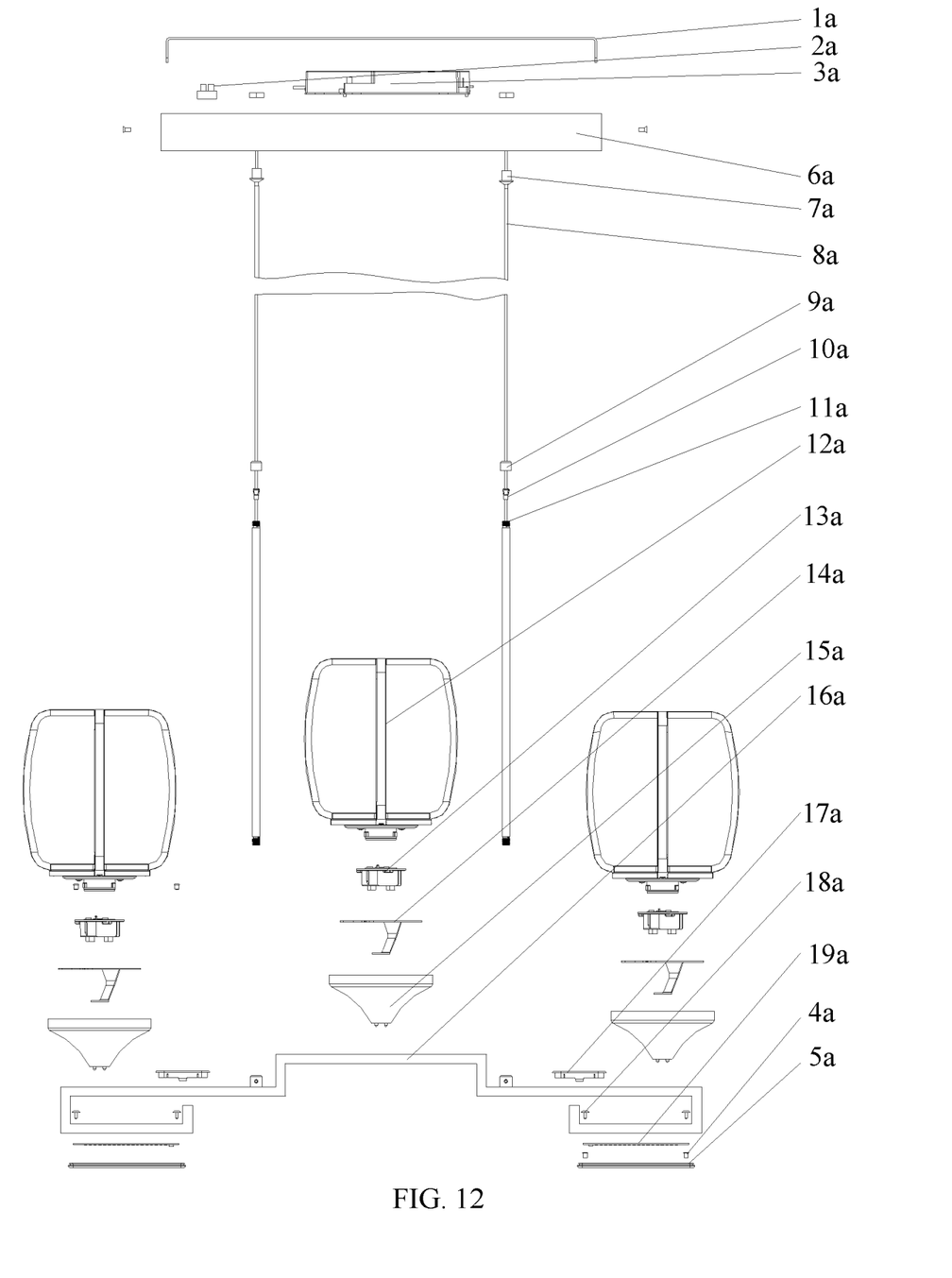
FIG. 12 is a schematic structural diagram of another pendant lamp disclosed in the example of the present disclosure.

Please refer to FIG. 12, which illustrates a pendant lamp structure including more light source modules. The pendant lamp illustrated in FIG. 12 includes a lamp base and a light source module 12b.

The lamp base includes a ceiling assembly 1b, a hoisting assembly and a lamp holder. The lamp holder is connected to the ceiling assembly 1b through the hoisting assembly, and the ceiling assembly 1b is usually mounted on a fixing foundation surface, such as an indoor roof. The hoisting assembly is connected to the lamp holder and is used for enabling the lamp holder to be in a hanging state. The light source module 12b is mounted on the lamp holder.

Because the number of the light source modules 12b is large, the hoisting assembly can include a hanging chain 5b, which has strong tensile property. Generally, the hanging chain 5b is a metal chain made of a metal material with high strength.

The top end of the hanging chain 5b can be fixed on the ceiling assembly 1b through the hook 4b, the threaded sleeve 3b and the nut 2b. One end of the threaded sleeve 3b passes through the ceiling assembly 1b and is fixed on the ceiling assembly 1b through a nut 2b, the hook 4b can be screwed with the threaded sleeve 3b, and the hanging chain 5b is hung on the hook 4b.

The other end of the hanging chain 5b can be connected with a first center box 7b, the first center box 7b can be connected with a second center box 11b through a center rod, and the plurality of lamp holders include a plurality of first lamp holders 6b and a plurality of second lamp holders 16b. The top ends of the plurality of first lamp holders 6b are sequentially distributed around the circumferential edge of the first center box 7b and are connected to the first center box 7b. The bottom ends of the plurality of first lamp holders 6b are sequentially distributed around the circumferential edge of the second center box 11b and are connected to the second center box 11b. The volume of the first lamp holder 6b is relatively large, and the two ends of the first lamp holder 6b are stably mounted through the first center box 7b and the second center box 11b respectively.

The first center box 7b and the second center box 11b are respectively mounted on the top and bottom ends of the center rod. The plurality of first lamp holders 6b are distributed discretely. A third center box 9b can be provided at a position between the two ends of the center rod, and a plurality of second lamp holders 16b are discretely fixed around the circumferential direction of the second center box 11b. The second lamp holder 16b is small in size, and only one end of the second lamp holder 16b needs to be fixed to the second center box 11b. The second lamp holders 16b are distributed between two adjacent first lamp holders 6b. The center rod can include an upper center rod 8b and a lower center rod 10, both of which are fixedly connected to the second center box 11b. The above structure enables the center rod to be disassembled, thus facilitating the transportation of the pendant lamp.

In a preferred scheme, the second center box 11b connected to the bottom end of the first lamp holder 6b faces the indoor floor, and based on this, the second center box 11b can be provided with a decorative part buckle 17b.

As illustrated in FIG. 12, in an example, the number of the first lamp holders 6b is ten, each first lamp holder 6b is provided with one light source module 12b, the number of the second lamp holders 16b is six, and each second lamp holder 16b is provided with one light source module 12b.

In addition, through the first lamp holder 6b and the second lamp holder 16b, the three-dimensional distribution of the light source modules 12b in the hanging direction can be better realized, and further the decorative property of the pendant lamp can be increased.

The light source module 12b can include the electrical connection device 600 described above, and the light source module 12b realizes mechanical connection and electrical connection with the lamp holder through the electrical connection device 600. In an example, the male end component is connected to the light source plate 500, and the female end component 13b is arranged on the lamp holder. The lamp holder can be provided with a fixing plate 14b, and the female end component 13b can be mounted on the fixing plate 14b. In a preferred scheme, the first lamp holder 6b and the second lamp holder 16b can be provided with a lamp cup 15b, and the bottom end of the light source module 12b can be mounted in the lamp cup 15b.

In the lighting lamp disclosed by the example of the present disclosure, the lamp holder can be of a hollow structure, so that the hidden arrangement of wires is convenient, and the appearance of the lighting lamp is not affected at the same time.

The present disclosure discloses a mounting assembly for an optical element of a lighting lamp, which aims to solve the problems of complicated assembling and disassembling operation and influence on light distribution caused by fixing the optical element by adopting a threaded connection part in the current lighting lamp.

A mounting assembly for an optical element of a lighting lamp, including a base, a top frame and at least two side frames, one end of each of the at least two side frames is connected to the base and the other end of each of the at least two side frames is connected to the top frame; the at least two side frames and the base and the top frame enclose an mounting space for fixing the optical element; and the at least two side frames are configured to be distributed around the optical element and being connected to a side edge of the optical element.

A light source module, including a light source panel provided with a light emitting element, an optical element, and the mounting assembly described above, the optical element is assembled into the mounting space, light of the light emitting element is configured to enter into the optical element, and the optical element includes a top end, a bottom end, the side edge, a first surface, and a second surface, both the first surface and the second surface are perpendicular to the top end, the bottom end, and the side edge, the first surface and the second surface are surfaces on opposite sides of the optical element, and the light of the light emitting element enters from the top end, the bottom end and/or the side edge and exits from the first surface and/or the second surface.

A lighting lamp, including a lamp base and a light source module, the light source module is connected to the lamp base, and the light source module is the light source module described above.

The above at least one technical solution adopted by the examples of the present disclosure can achieve some or all following beneficial effects:

In the mounting assembly disclosed by the examples of the present disclosure, the optical element can be assembled and positioned in the mounting space surrounded by the at least two side frames, the base and the top frame, the optical element can be fixed in the whole fixing process without adopting a threaded connection part, and the assembly of the optical element can be realized in the mounting space formed by the connection among the side frames, the base and the top frame. This may avoid the problem of complicated disassembly and assembly caused by screwing a plurality of threaded connection parts when the optical element is connected to other components through threaded connection parts. At the same time, because the optical element is not assembled by threaded connection parts, the influence of the threaded connection parts on the light distribution of the optical element can be avoided.

The above examples of the present disclosure focus on the differences between different examples. As long as there is no contradiction between the different optimization features of different examples, they can be combined to form a better example. Considering the brevity of the description, it is not repeated herein.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The above description is only examples of the present disclosure and is not intended to limit the present disclosure. Various modifications and variations are possible to those skilled in the art.

The invention claimed is:

1. A mounting assembly for an optical element of a lighting lamp, comprising:
a base, a top frame, and at least two side frames, and wherein:
one end of each of the at least two side frames is connected to the base and the other end of each of the at least two side frames is connected to the top frame,
the at least two side frames, the base and the top frame enclose a mounting space for fixing the optical element,
the at least two side frames are configured to be distributed around the optical element and to be connected to a side edge of the optical element, and bottom ends of the at least two side frames are clamped and fixed to the base.

2. The mounting assembly according to claim 1, wherein: bottom ends of the at least two side frames are integrated with the base, and top ends of the at least two side frames are detachably connected to the top frame; or, the top ends of the at least two side frames are integrated with the top frame, and the bottom ends of the at least two side frames are detachably connected to the base.

3. The mounting assembly according to claim 1, wherein:
top ends of at least two side frames are clamped and fixed to the top frame.

4. The mounting assembly according to claim 1, wherein:
the base is provided with a first clamping groove or a first protrusion for plug-in fitting with bottom end of the optical element; or
the top frame is provided with a second clamping groove or a second protrusion for plug-in fitting with top end of the optical element; or
the at least two side frames are provided with a third clamping groove or a third protrusion for plug-in fitting with the side edge.

5. The mounting assembly according to claim 1, wherein:
the top frame or the at least two side frames are plastic parts.

6. The mounting assembly according to claim 1, wherein:
the base is provided with a first clamping groove for plug-in fitting with bottom end of the optical element;
the top frame is provided with a second clamping groove for plug-in fitting with top end of the optical element;
each of the at least two side frames is provided with a third clamping groove for plug-in fitting with the side edge; and
the first clamping groove, the second clamping groove and the third clamping groove are connected with each other.

7. A light source module, comprising:
a light source panel provided with a light emitting element, an optical element, and a mounting assembly comprising a base, a top frame, and at least two side frames, and
wherein one end of each of the at least two side frames is connected to the base and the other end of each of the at least two side frames is connected to the top frame, the at least two side frames, the base and the top frame enclose a mounting space for fixing the optical element, and the at least two side frames are configured to be distributed around the optical element and to be connected to a side edge of the optical element; and
wherein the optical element is assembled into the mounting space, light of the light emitting element is configured to be incident into the optical element, and the optical element comprises a top end, a bottom end, a side edge, a first surface, and a second surface, wherein both the first surface and the second surface are perpendicular to the top end, the bottom end, and the side edge, the first surface and the second surface are surfaces on opposite sides of the optical element, and the light of the light emitting element is incident from the top end, the bottom end or the side edge and is emitted from the first surface or the second surface.

8. The light source module according to claim 7, wherein the light source panel is arranged on the base, and the light emitting element is arranged to be opposed to the bottom end of the optical element.

9. The light source module according to claim 7, wherein the light source panel is arranged on the side frames, and the light emitting element is arranged to be opposed to the side edge of the optical element.

10. The light source module according to claim 7, wherein the optical element is a light guide plate, wherein the light guide plate comprises a base plate and a number of sub plates connected to the base plate and intersected with the base plate, and an edge of the base plate and edges of the number of sub plates away from the base plate are side edges.

11. The light source module according to claim 10, wherein the number of the sub plates are two, the two sub plates are connected to two side surfaces of the base plate, and form a light guide plate having a cross-section of a cross shape with the base plate.

12. The light source module according to claim 10, wherein:
the base plate is provided with a first connection groove,
the number of the sub plates is one, and the sub plate has a second connection groove, and
the base plate is in plug-in fitting with the second connection groove, and the sub plate is in plug-in fitting with the first connection groove.

13. The light source module according to claim 8, further comprising a fixing part and a radiator, wherein the fixing part is interfaced with the radiator to form an accommodating cavity, wherein the light source plate is arranged in the accommodating cavity, and the radiator is provided with a first avoiding hole capable of avoiding light of the light emitting element.

14. The light source module according to claim 13, wherein an electrically insulating and heat conductive pad is provided between the light source plate and the radiator, and a second avoiding hole is provided in a position of the electrically insulating and heat conductive pad opposite to the first avoiding hole.

15. The light source module according to claim 13, wherein a quick electrical connector is provided on a side of the fixing part away from the light source panel.

16. The light source module according to claim 15, wherein:
the quick electrical connector is a female end component or a male end component, and the female end component has a plurality of conductive terminals arranged in parallel and a plurality of compression springs acting on each of the conductive terminals;
the male component has a male end circuit board, and a surface of the male end circuit board facing the plurality of conductive terminals is provided with a plurality of male end conductive parts; and
the male end component is detachably mounted to the female end component, and upon the male end component being mounted to the female end component, each of the compression springs allows one of the conductive terminals to be subjected to a force directed to a corresponding male end conductive part, so that the conductive terminal is in abutting contact with the corresponding male end conductive part.

17. A lighting lamp, comprising a lamp base and a light source module, wherein the light source module is connected to the lamp base, wherein the light source module comprises a light source panel provided with a light emitting element, an optical element, and a mounting assembly comprising a base, a top frame, and at least two side frames, and
wherein one end of each of the at least two side frames is connected to the base and the other end of each of the at least two side frames is connected to the top frame, the at least two side frames, the base and the top frame enclose a mounting space for fixing the optical element, and the at least two side frames are configured to be distributed around the optical element and to be connected to a side edge of the optical element; and
wherein the optical element is assembled into the mounting space, light of the light emitting element is configured to be incident into the optical element, and the optical element comprises a top end, a bottom end, a side edge, a first surface, and a second surface, wherein both the first surface and the second surface are perpendicular to the top end, the bottom end, and the side edge, the first surface and the second surface are surfaces on opposite sides of the optical element, and the light of the light emitting element is incident from the top end, the bottom end or the side edge and is emitted from the first surface or the second surface.

18. The lighting lamp according to claim 17, wherein the lighting lamp is a street lamp, a desk lamp, a floor lamp, a wall lamp, a ceiling lamp, or a pendant lamp.

19. The lighting lamp according to claim 18, wherein the lighting lamp is a pendant lamp, and the lamp base of the lighting lamp comprises a ceiling assembly, a hoisting assembly and a lamp holder, wherein the ceiling assembly is configured to be fixed on a fixing foundation surface, one end of the hoisting assembly is connected to the ceiling assembly, and the other end of the hoisting assembly is connected to the lamp holder; and the light source module is mounted on the lamp holder.

* * * * *